Dec. 7, 1937.  B. ROBLES  2,101,652
SAFETY EXPOSURE RECORDER FOR CAMERAS
Filed May 14, 1935  2 Sheets-Sheet 1
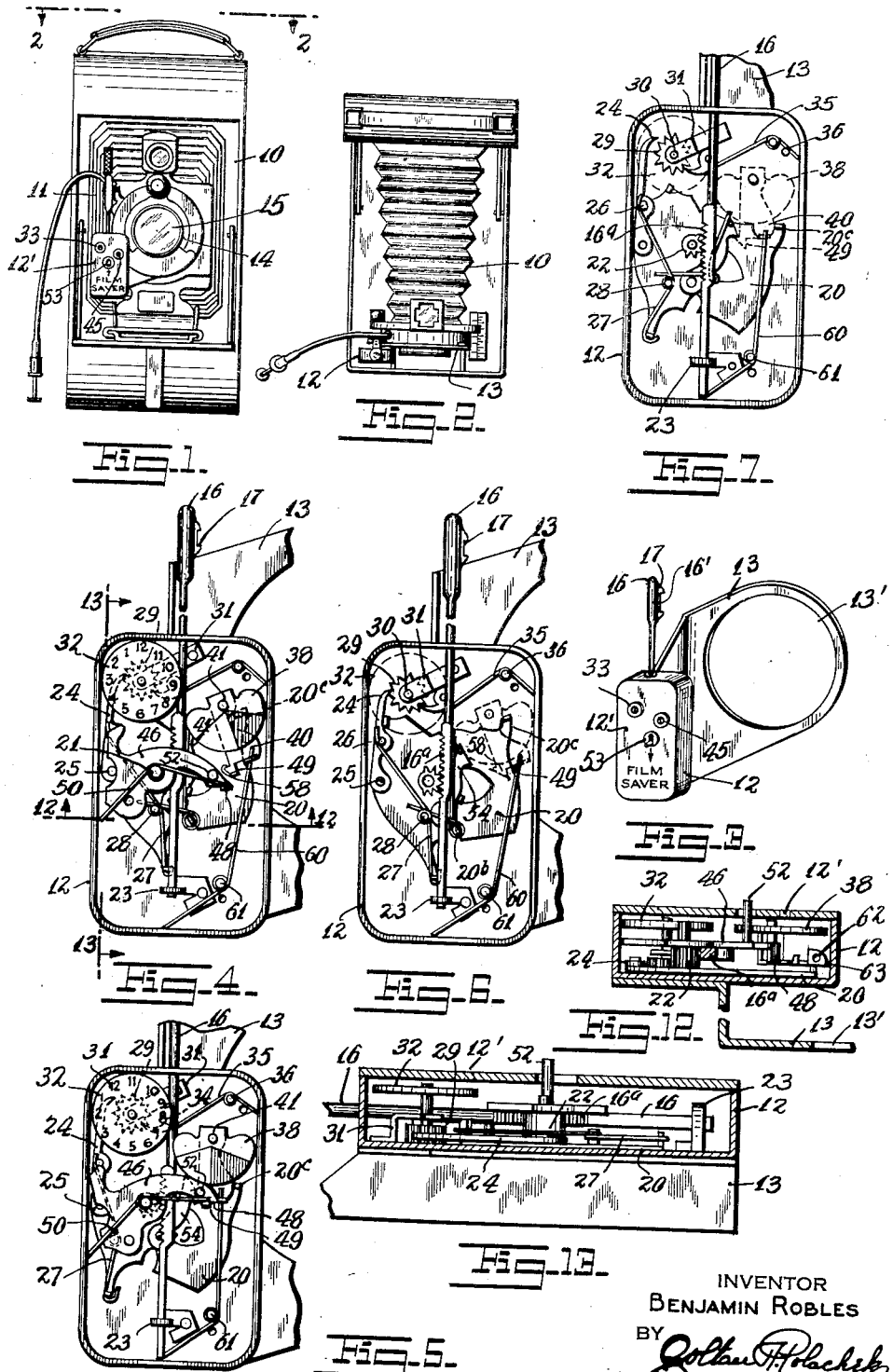
INVENTOR
BENJAMIN ROBLES
BY
ATTORNEY Dec. 7, 1937. B. ROBLES 2,101,652
SAFETY EXPOSURE RECORDER FOR CAMERAS
Filed May 14, 1935 2 Sheets-Sheet 2

INVENTOR
BENJAMIN ROBLES
BY
ATTORNEY

Patented Dec. 7, 1937

2,101,652

UNITED STATES PATENT OFFICE 2,101,652

SAFETY EXPOSURE RECORDER FOR CAMERAS

Benjamin Robles, Palmira, Chuva, Guatemala

Application May 14, 1935, Serial No. 21,404

4 Claims. (Cl. 116—114)

This invention relates to new and useful improvements in a safety exposure register for cameras having shutters operated by levers moving both down and up for one exposure.

The invention has for an object the construction of a device adapted as an attachment on cameras or as original equipment for cameras characterized by an arrangement wherein the camera shutter is controlled in a fashion so as to prevent double exposure and wasting of the film in other respects.

More particularly the invention proposes the construction of a device as mentioned which is characterized by an arrangement which is adapted to register each time the camera shutter is operated and to restrain subsequent operation until the register is operated to allow such function.

Still further the invention proposes to so construct the device that a camera shutter control lever is adapted to assume its initial position after operation of the shutter, but cannot be again operated unless a register mechanism is released.

Still further the invention proposes the provision of a register unit upon the device adapted to advance one unit upon each depression of the lever which controls the shutter so that the number of exposed films will be known.

Still further the invention also proposes the provision of an indicator to show each depression of a stem associated with the shutter control and to show the released or the engaged condition of the mechanism which holds the shutter operating lever against depression.

Still further the invention has for an object the construction of a device of the class described which is of simple and durable construction and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Fig. 1 is a front elevational view of a camera with its bellows extended and equipped with a safety exposure register according to this invention.

Fig. 2 is plan view of Fig. 1 looking in the direction of line 2—2 of Fig. 1.

Fig. 3 is a perspective view of the safety exposure register illustrated per se.

Fig. 4 is a fragmentary front elevational view of the register shown with the front cover removed.

Fig. 5 is a view similar to Fig. 4 but illustrating the register with its stem in the depressed condition.

Fig. 6 is a view similar to Fig. 4 but showing certain upper parts removed so that the lower parts may be readily seen.

Fig. 7 is a view similar to Fig. 6 but showing the device with the stem in the depressed condition.

Fig. 12 is a sectional view taken on the line 12—12 of Fig. 4.

Fig. 13 is a sectional view taken on the line 13—13 of Fig. 4.

Figure 8:
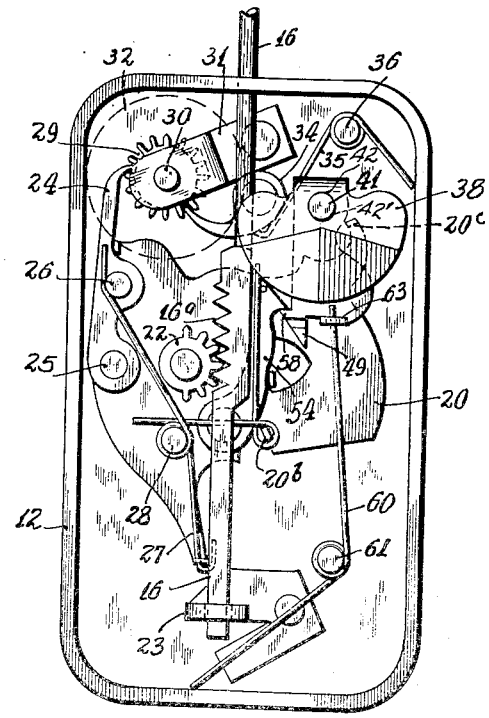
Fig. 8 is a view similar to Fig. 7 but showing the stem in the raised position but with a certain catch operating.
Figure 9:
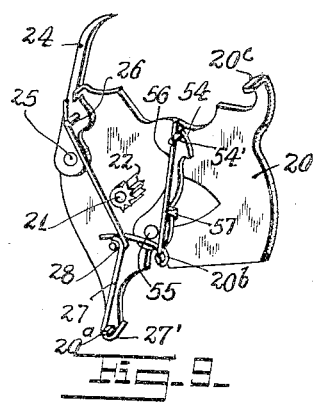
Fig. 9 is a perspective view of the base plate and certain associated parts of the mechanism of the register.
Figure 10:
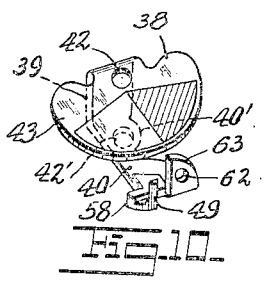
Fig. 10 is a perspective view of certain parts of the indicator per se.
Figure 11:
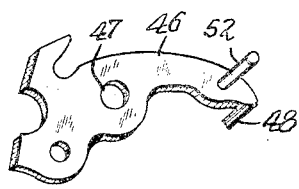
Fig. 11 is a perspective view of one of the parts of the device.

The safety exposure register for cameras according to this invention is used in combination with a camera 10 having a shutter controller with a depressible lever 11. The details of the shutter will not be given in this specification since cameras of this type are generally known. The invention is applicable to various types of cameras of different manufacture in which the shutter operation is controlled by some depressible member. The register is shown mounted within a casing 12 having a removable cover 12'. A bracket 13 is attached upon the rear of this casing 12 and is formed with an opening 13' adapted to engage over holding rings 14 of the lenses 15 of the camera in such a manner that the register is firmly supported on the camera.

The register has a depressible stem 16 formed with a projecting portion 16' having a recess 17 adapted to receive a portion of a depressible lever 11 so that the lever has a certain free amplitude of motion, and upon full depression (to operate the shutter of the camera) the stem 16 will be depressed. The design of the association of the stem with the depressible shutter control lever may vary depending upon the design of the camera to which the attachment is applied. The object of the construction is to so associate the stem as to be operative and to be depressed when the shutter is actuated.

A register is associated with the depressible stem and is adapted to advance one unit upon each depression of the stem. More particularly, this register comprises a base plate 20 within the casing and fixed upon a spindle 21 which is pivotally mounted on the base of the casing in such a manner that the plate 20 may pivot. A segmental gear 22 is fixed upon the spindle 21 and meshes with a rack portion 16a arranged upon the stem 16. The stem 16 is slidable by reason of engaging through one side of the casing 12 and through a bearing 23 fixed within the casing.

A pawl 24 is pivotally mounted at one end 25 upon the plate 20 and has a projecting stud 26. A spring 27 has one end 27' bearing against a small lug 20a projecting from the plate 20 and has several turns around a stud 28 projecting from the plate 20 and extends over and acts against the stud 26 so as to normally urge the pawl clockwise. The pawl 24 is adapted to engage a ratchet wheel 29 fixed upon a spindle 30 rotatively mounted on the casing 12 and on a bracket 31 fixed within the casing. A disc 32 is fixed upon the upper end of the spindle 30 and is graduated with numerals corresponding with the teeth of the ratchet 29. The cover 12' of the casing is formed with a small window opening 33 through which one of the numerals upon the disc 32 may be seen. A pawl 34 is pivotally mounted upon the casing 12 and is urged against the ratchet wheel 29 by a spring 35 which has several turns upon a stud 36 projecting from the casing and has one of its ends engaging against the side wall of the casing.

When the stem 16 is moved downwards, the segmental gear 22 will be turned and will rotate the plate 20 so as to cause the pawl 24 to move the ratchet 29 and the disc 32 clockwise. When the stem 16 moves upwards the plate 20 will be moved back to its original condition but the pawl 24 will idle over the teeth of the ratchet 29 which is held against back turning by the pawl 34. Consequently, the register has advanced one unit.

An indicator is associated with the device to show that the stem has been depressed and a holding mechanism to prevent another depression of the stem if the indicator has not as yet been rendered inoperative. This indicator comprises an indicator portion 38 having a neck portion 39 connecting with a lower portion 40. The indicator is pivotally mounted upon a stud 41 projecting from the casing 12. This stud 41 engages through superimposed openings 42 and 42' formed in the indicator, see Fig. 8. The top portion 38 of the indicator is provided with a sheet member 43 having a white section and a red section. The indicator is arranged immediately behind a window opening 45 in the casing cover 12 in such a manner so that the white section is viewable when the stem 16 is free to be depressed and the red section is viewable when the stem is latched against full depression as hereinafter explained.

A means is provided for holding the indicator 38 in its "red" indicating position. This means comprises a member 46 formed with a central opening 47 freely mounted upon the stud 21. This member 46 has a depending finger 48 adapted to engage with a hook 49 formed upon the bottom section 40 of the indicator. In Fig. 4 the finger and hook are shown in inoperative positions with the member 46 in its depressed position while in Fig. 5 finger 48 is shown engaging the hook 49 so that the indicator is held in the operative position. A spring 50 has several turns about the stud 21 and has one end acting against the side of the casing and the other end against the stud 52 projecting from the member 46 for urging said member 46 to a position in which the finger 48 will catch and hold hook 49. This stud 52 also projects through an elongated slot 53 formed in the cover 12'. The arrangement is such that the member 52 may be manually moved to a released position (clearly shown in Fig. 4) so that the indicator is released. The normal position of the member 46 is shown in Fig. 5.

A catch 54 is pivotally mounted upon the plate 20 on a stud 55 projecting from the plate. A spring 56 has a turn around a projection 20b from the plate 20 and has one end engaging the stud 28, and the other end engaging a small projection 54' from the catch 54. The arrangement is such that the catch 54 is urged into an operative position against a small lug 57 projecting from the plate 20. The catch 54 is adapted to act in conjunction with a hook 58 upon the lower portion 40 of the indicator. The arrangement is such that the catch 54 may engage the hook 58 to hold the stem 16 from being depressed. A spring 60 has several turns around a stud 61 mounted on the casing 12 and has one of its ends engaging the side wall of the casing and has its other end engaging into an opening 62 formed in a lug 63 projecting from the base portion 40 of the indicator. The function of the spring 60 is to urge the indicator into its inoperative position.

A lug 20c projects from a portion of the plate 20 and is adapted to engage against a cam surface 40' upon a lower portion 40 of the indicator to cause the pivoting of the indicator as the plate 20 pivots. In Fig. 4 the lug 20c is shown in the inoperative position, while in Fig. 5 it is shown in the operative position holding the indicator in its operative position.

The operation of the device is as follows: When a new film is placed into the camera the register should first be adjusted (by repeated operation of the camera shutter without any film being in the camera) so that number 12 on the disc 31 is viewable through the window opening 37. The register is adapted for a film having twelve exposures. If a film of a lesser number of exposures is used then the register need not be operated to its entire capacity. When the first exposure is taken on the camera the shutter lever 11 will move downwards to operate the shutter. This will cause the depression of the stem 16, which because of the rack portion 16a acting against the segmental gear 22, causes pivoting of the plate 20 upon the stud 21. The pivoting of the plate 20 will cause the pawl 24 to advance the register one unit so that the numeral 1 is now viewable through the window opening 33, showing that one exposure has been taken on the film. The plate 20 and the lug 20c will pivot the indicator to its operative position so that the red is now viewable through the opening 45. The indicator will be held in the operative position by the finger 48 engaging the hook 49. The stem 16 is free to move upwards when the shutter control lever 11 moves upwards and in so doing will pivot the plate 20 back to its original position. The indicator 38 will remain in its operative position because it is held by the finger 48 engaging the hook 49.

In the returned position of the plate 20 it is held against pivoting by reason of the catch 54 now engaging the hook 58 of the indicator. It is now impossible to take a second exposure because the stem 16 cannot be depressed by the shutter control lever 11. The operator of the camera therefore has a warning to advance his film to the next exposure. The exposure device may be set into operative condition again by manually moving the projection 52 which extends through the opening 53 in the cover 12' downwards so that the finger 43 releases the hook 49. The indicator 38 will then be returned to its original position by the spring 60. The catch 54 now no longer engages the hook 58 and the stem 16 is free to be depressed.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. In combination with a camera having a shutter operable with a depressible lever moving down and up for one exposure, a casing mounted on the front of said camera and having a window opening therein, a stem slidably mounted in said casing and having a rack portion thereon and adapted to be operatively connected with said depressible lever, a spindle pivotally mounted on said casing, a plate fixed on said spindle, a segmental gear fixed on said spindle and engaging said rack to pivot said plate when said stem is depressed, and a means engageable with a portion of said plate to indicate that said lever has been depressed, said means comprising a stud fixed on said casing, an indicator pivotally mounted on said stud and having indicating indicia on the face thereof and adapted to be viewed through said opening, a lug on said plate adapted to engage said indicator to pivot said indicator when said plate is pivoted by depressing and releasing said stem to change the indicia viewable through said opening.

2. In combination with a camera having a shutter operable with a depressible lever moving down and up for one exposure, a casing mounted on the front of said camera and having a window opening therein, a stem slidably mounted in said casing and having a rack portion thereon and adapted to be operatively connected with said depressible lever, a spindle pivotally mounted on said casing, a plate fixed on said spindle, a segmental gear fixed on said spindle and engaging said rack to pivot said plate when said stem is depressed, and a means engageable with a portion of said plate to indicate that said lever has been depressed, said means comprising a stud fixed on said casing, an indicator pivotally mounted on said stud and having indicating indicia on the face thereof and adapted to be viewed through said opening, a lug on said plate adapted to engage said indicator to pivot said indicator when said plate is pivoted by depressing and releasing said stem to change the indicia viewable through said opening, a means for holding said indicator in its operable position.

3. In combination with a camera having a shutter operable with a depressible lever moving down and up for one exposure, a casing mounted on the front of said camera and having a window opening therein, a stem slidably mounted in said casing and having a rack portion thereon and adapted to be operatively connected with said depressible lever, a spindle pivotally mounted on said casing, a plate fixed on said spindle, a segmental gear fixed on said spindle and engaging said rack to pivot said plate when said stem is depressed, and a means engageable with a portion of said plate to indicate that said lever has been depressed, said means comprising a stud fixed on said casing, an indicator pivotally mounted on said stud and having indicating indicia on the face thereof and adapted to be viewed through said opening, a lug on said plate adapted to engage said indicator to pivot said indicator when said plate is pivoted by depressing and releasing said stem to change the indicia viewable through said opening, a means for holding said indicator in its operable position, a member freely mounted on said spindle, a projecting stud on said member, a spring having several turns on said spindle and acting between the side of said casing and said projecting stud to hold said member in an operative position, a depending finger on said member, a hook on said indicator adapted to engage said finger when said indicator is pivoted to hold said indicator in an operable position to show that said stem is depressed.

4. In combination with a camera having a shutter operable with a depressible lever moving down and up for one exposure, a casing mounted on the front of said camera and having a window opening therein, a stem slidably mounted in said casing and having a rack portion thereon and adapted to be operatively connected with said depressible lever, a spindle pivotally mounted on said casing, a plate fixed on said spindle, a segmental gear fixed on said spindle and engaging said rack to pivot said plate when said stem is depressed, and a means engageable with a portion of said plate to indicate that said lever has been depressed, said means comprising a stud fixed on said casing, an indicator pivotally mounted on said stud and having indicating indicia on the face thereof and adapted to be viewed through said opening, a lug on said plate adapted to engage said indicator to pivot said indicator when said plate is pivoted by depressing and releasing said stem to change the indicia viewable through said opening, a means for holding said indicator in its operable position, a member freely mounted on said spindle, a projecting stud on said member, a spring having several turns on said spindle and acting between the side of said casing and said projecting stud to hold said member in an operative position, a depending finger on said member, a hook on said indicator adapted to engage said finger when said indicator is pivoted to hold said indicator in an operable position to show that said stem is depressed, said projecting stud adapted to extend from said casing to allow said member to be manually pivoted against the normal action of said spring to disengage said finger from said hook to allow said indicator to return to an inoperative position.

BENJAMIN ROBLES.